US010829887B2

(12) United States Patent
Lundt

(10) Patent No.: US 10,829,887 B2
(45) Date of Patent: Nov. 10, 2020

(54) APPARATUS FOR RECEIVING, SPREADING/EXTENDING AND FLATTENING

(71) Applicant: Jensen Denmark A/S, Ronne (DK)

(72) Inventor: Morten Lundt, Ronne (DK)

(73) Assignee: JENSEN DENMARK A/S, Ronne (DK)

( * ) Notice: Subject to any disclaimer, the term of this patent is extended or adjusted under 35 U.S.C. 154(b) by 232 days.

(21) Appl. No.: 16/084,181

(22) PCT Filed: Mar. 9, 2017

(86) PCT No.: PCT/EP2017/055525
§ 371 (c)(1),
(2) Date: Sep. 11, 2018

(87) PCT Pub. No.: WO2017/153511
PCT Pub. Date: Sep. 14, 2017

(65) Prior Publication Data
US 2020/0291566 A1    Sep. 17, 2020

(30) Foreign Application Priority Data
Mar. 11, 2016 (DK) .................. 2016 70143

(51) Int. Cl.
*D06F 67/04* (2006.01)
*D06F 67/02* (2006.01)
(Continued)

(52) U.S. Cl.
CPC .............. *D06F 67/04* (2013.01); *D06C 3/00* (2013.01); *D06F 67/02* (2013.01); *D06F 69/02* (2013.01);
(Continued)

(58) Field of Classification Search
CPC .......... D06F 67/00; D06F 67/02; D06F 67/04; D06F 67/06; D06F 67/10; D06F 69/00;
(Continued)

(56) References Cited

U.S. PATENT DOCUMENTS 2,976,625 A * 3/1961 Bazelmans .............. D06C 3/00
38/2
3,414,997 A * 12/1968 Henry ..................... D06F 67/04
38/143
(Continued)

FOREIGN PATENT DOCUMENTS

CH          681638 A5     4/1993
CN        101205684        6/2008
(Continued)

OTHER PUBLICATIONS

International Search Report for PCT/EP2017/055525, dated Sep. 14, 2017, 4 pages.
(Continued)

*Primary Examiner* — Ismael Izaguirre
(74) *Attorney, Agent, or Firm* — McDermott, Will & Emery LLP

(57) ABSTRACT

The invention relates to an apparatus (100) for receiving and spreading out/extending cloth (3), such as pieces of laundry, comprising a set of spreader clamps (120) for releasably receiving a pair of corners of said cloth (3) and for spreading out of said cloth (3), a suction box system (S) including: a suction chute (170) connected with a front portion of a suction chamber (200) and having a mouth for receiving said cloth (3), and a suction fan (119) communicating with a rear portion of said suction chamber (200) via a number of air flow passages (185), the suction fan (119) establishing suction in said suction chamber (200) and said suction chute (170), whereby said suction box system (S) additionally includes a discharge conveyor (C) for the discharge of cloth
(Continued)

(3) collected in said suction chamber (200), a discharge gate (320) selectively openable for said discharge, and an air access gate (430) operable for temporarily reducing suction applied by said fan (119) through said air flow passages (185).

8 Claims, 3 Drawing Sheets

(51) Int. Cl.
    *D06F 69/02*    (2006.01)
    *D06F 95/00*    (2006.01)
    *D06C 3/00*     (2006.01)
(52) U.S. Cl.
    CPC ...... *D06F 95/00* (2013.01); *B65G 2201/0229* (2013.01)
(58) Field of Classification Search
    CPC ........ D06F 69/02; D06F 95/00; D06F 95/002; D06C 3/00; D06C 3/02; B65G 2201/0229
    See application file for complete search history.

(56) References Cited

U.S. PATENT DOCUMENTS

| | | | |
|---|---|---|---|
| 3,568,341 A | * | 3/1971 | Buss ........................ D06F 67/04 38/143 |
| 3,909,964 A | | 10/1975 | Wenck |
| 4,967,495 A | * | 11/1990 | Weir ........................ D06F 67/04 38/143 |
| 5,815,963 A | * | 10/1998 | Rauch ..................... D06F 67/04 38/143 |
| 2007/0000158 A1 | | 1/2007 | Baboz et al. |

FOREIGN PATENT DOCUMENTS

| | | | |
|---|---|---|---|
| CN | 103582728 | | 2/2014 |
| DE | 2824084 A | * | 12/1979 |
| EP | 0153069 A2 | | 8/1985 |
| EP | 554204 A1 | | 8/1993 |
| EP | 1820894 | | 8/2007 |
| EP | 1820894 A1 | | 8/2007 |
| EP | 2977505 A1 | | 1/2016 |
| JP | H11156098 | | 6/1999 |
| JP | 2008115498 | | 5/2008 |
| JP | 2008308782 | | 12/2008 |
| JP | 2013215361 | | 10/2013 |

OTHER PUBLICATIONS

Written Opinion of the International Searching Authority, for PCT/EP2017/055525, dated Sep. 14, 2017, 8 pages.
Denmark Examination Report for App. No. 35497714, dated Oct. 19, 2016, 5 pages.

* cited by examiner ered Wall Portion
APPARATUS FOR RECEIVING, SPREADING/EXTENDING AND FLATTENING

FIELD OF THE INVENTION

The invention relates to a charging and stretching apparatus for receiving, spreading out and flattening pieces of laundry, and for arranging the spread out pieces of laundry in a flat form onto a conveyor, to allow for subsequent processing thereof in ironing machines, folding machines or the like.

BACKGROUND OF THE INVENTION

After articles such as bed sheets, table linens, blankets, or the like are washed in a laundry facility, they are typically fed into a flatwork ironer and automatically folded into a neat package for use in hotels, hospitals, or the like. In order to obtain a neatly folded, unwrinkled package, it is important that the sheet is presented to the ironer with no wrinkles or folds and with the leading edge straight.

Modern laundry facilities use an automatic spreader and feeder apparatus with spreader clamps to allow for a more rapid and accurate feeding of the sheets into the ironer in a flattened form. Such apparatus is disclosed in EP 554 204 and 2 977 505. To assist in the flattening of the cloth a suction box may be provided, as shown in EP 2 977 505. A suction box used with another laundry supply apparatus is disclosed in CH 681 638 to which further reference will be made below.

It is a problem that spreader apparatuses as above inevitably have down periods arising from cloth misfeeds which may occur from time to time. Hence, there is a need for a novel spreader apparatus which has an improved efficiency by being able to eliminate such down periods.

SUMMARY OF THE INVENTION

To solve the aforementioned problem occurring where pieces of laundry/cloth are dropped into the suction chamber as a result of a misfeed the invention provides for an apparatus of the type discussed above wherein a suction box system with a suction chute, suction chamber and a suction fan communicates with a rear portion of the suction chamber via a number of air flow passages to establish suction, the suction box system additionally including a discharge conveyor for discharge of cloth collected in the suction chamber, a discharge gate selectively openable for said discharge, and an air access gate operable for temporarily reducing suction applied by the fan through the air flow passages.

In this way cloth in the suction chamber may be discharged unhindered by any strong flow of air flowing in the suction chamber without the need to stop the fan.

Preferably, the suction box system comprises an intermediate chamber between the suction fan and the suction chamber, the air access gate establishing on opening thereof direct air flow communication between the intermediate chamber and the ambient. This reduces any risk of damaging the fan.

Preferably, an apertured wall of the suction chamber is arranged to extend upwardly away from the bottom of the suction chamber whereby the risk that the cloth in the suction chamber is drawn against the apertures to block them and damage the fan is reduced since the effect of gravity must be overcome.

An embodiment of the invention will now be explained in more detail with reference to the appended drawings.

DETAILED DESCRIPTION

Figure 1:
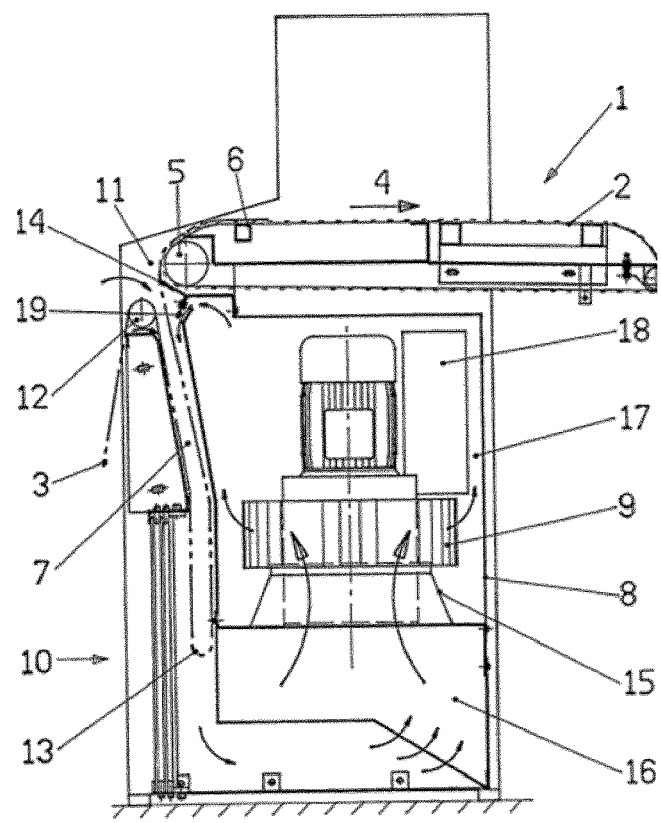
FIG. 1 shows a prior art suction box system.

FIG. 1 shows a prior art suction box system as disclosed in CH 681 638 and forming part of an apparatus 1 having a principal conveyor 4 with a driven belt supporting processed pieces of laundry 3 to be delivered to an ironer. A suction box of the system includes a suction chamber as well as a chute 7 having a dimension (out of the plane of the paper) corresponding at least to the width of a piece of laundry 3 received by the apparatus 1.

To remove wrinkles/folds each piece of laundry 3 received at the front side 10 of the apparatus 1 is drawn into the chute 7, assisted by an intense flow of air sucked into the chute 7, to form a loop 13 therein of the piece of laundry 3. Such a loop 13 allows for processing of pieces of laundry 3 having a length longer than the height of the apparatus 1. The intense flow of air drawn into the chute 7 from above is generated by a suction fan 9, and the air flows in the chute 7 along the surfaces of the piece of laundry 3. This air flow brings about a flattening of the laundry by removing folds/wrinkles.

The suction fan 9 communicates with a suction chamber located near the base of the apparatus 1, via an intermediate chamber 16 which acts as a manifold and which is separated from the suction chamber by a wall which to the right in the drawing has a downwardly oriented apertured wall portion having flow apertures. This downwardly oriented portion is located at the rear end of the suction box, which rear end is close to the rear side of the apparatus 1.

An improved suction box system S according to the present invention, comprising i.a. a suction box with a suction chamber 200, a suction chute 170 and a suction fan 119, will now be discussed with reference to FIG. 2, in the context of a spread feeder apparatus 100; a piece of laundry will in the following be referred to by the generic term "cloth". Flattening processing of cloth is carried out by this apparatus 100 in the general manner discussed above with reference to FIG. 1.

Figure 2:
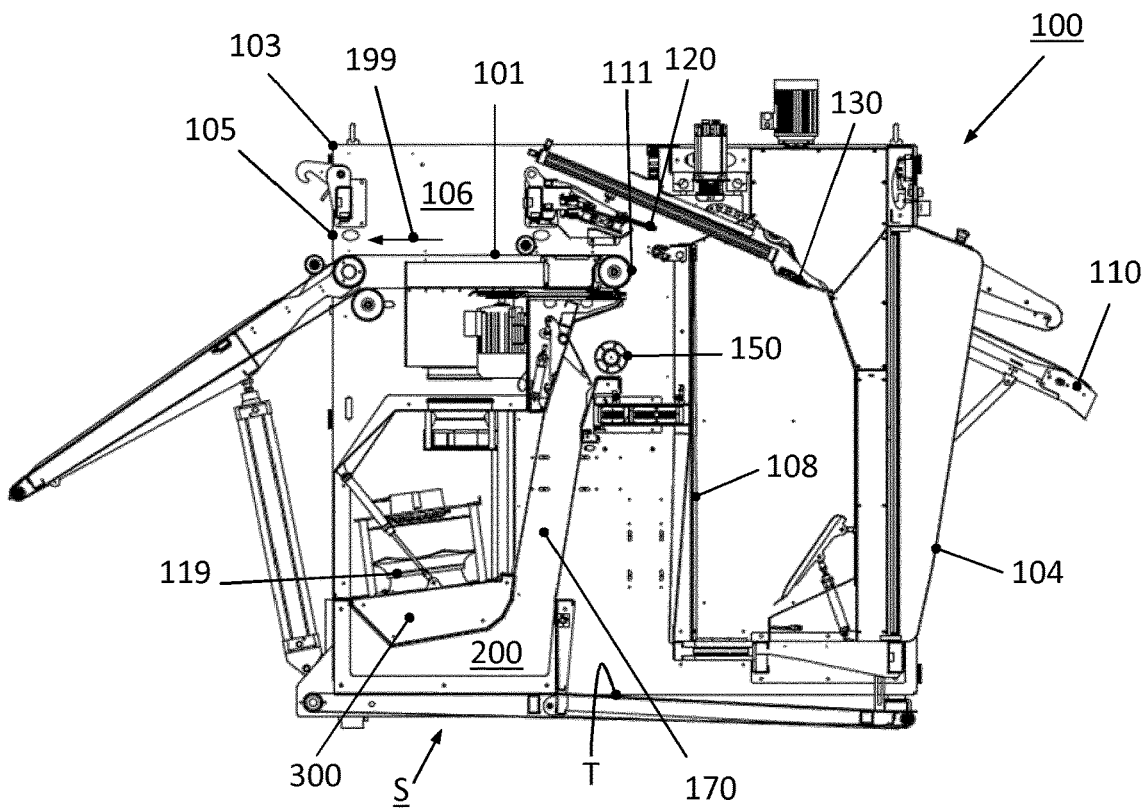
FIG. 2 shows a side view of a spreader apparatus with the novel suction box system of the present invention.

FIG. 2 shows a side view of an embodiment of a spread feeder apparatus 100 for receiving and spreading a four edge piece of cloth (not shown) and having a forward machine direction 199 corresponding to the delivery direction of straightened and flattened cloth. The apparatus 100 includes a housing 103 having a front side 104, a rear side 105, as well as two opposite longitudinal side walls 106 (of which only one is shown) extending parallel with the machine direction 199. A principal conveyor 101 with a belt supports and delivers spread cloth lying flat thereon to a downstream processing station (not shown), such as an ironer.

The apparatus 100 comprises, arranged along the length of the front side 104, a number of charger stations of which only one referenced by numeral 110 is shown, each charger station being for catching a manually introduced piece of laundry along one of its longer edges, and for locating a pair of adjacent corners of the cloth. Charger stations of this type are generally known.

The apparatus 1 further comprises a gripper 130 for gripping onto the aforementioned two corners located at the charger stations 110. Two clamps 120 of a spreader are configured for releasably receiving a respective one of the aforementioned two corners in that the cloth suspended from the gripper 130 is moved by the gripper 130 from right to left through a vertical gap (not shown) between two sections of a vertical partition wall 108, the gap being located centrally between the two side walls 106. When receiving the cloth the two clamps 120 are located near each other centrally between the opposite sides walls 106. With the cloth normally being longer than the height of the apparatus 100 the trailing edge of the cloth, together with a portion of the cloth, will be resting on a surface T near the bottom of the apparatus 100, which surface T preferably is defined by a further conveyor C to be discussed below.

The two clamps 120 having received a respective corner of the cloth are then operated to move in opposite directions away from each other transversally to the machine direction 199, as shown by way of example in FIG. 7 of EP 1 820 894. The cloth being at this point located behind the partition wall 108, on the side thereof facing away from the front side 104, is hereby stretched/extended.

In this stretched/extended configuration the cloth is released from the two clamps 120 of the spreader only to be immediately caught at the leading edge thereof by the face of a front loop 111 of the principal conveyor 101, which conveyor 101 preferably has a belt with a high-friction surface. To assist in bringing the cloth into contact with the conveyor 101 belt an air blast oriented to the left in the figure may be provided.

This results in the leading edge of the cloth caught by the conveyor 101 belt starting to move in the machine direction 199, advanced by and supported on top of the conveyor 101 belt. At this point a portion of the cloth will still hang suspended, in front of an elongated roller 150 having a high friction surface and rotating anti-clockwise at high speed below the aforementioned front loop 111. This suspended portion of the cloth is brought into contact with the roller 150 along the full width of the cloth, such as by an air blast delivered from air nozzles (not shown). When this suspended portion is caught by the roller 150 it is driven upwards by the roller 150.

Figure 3:
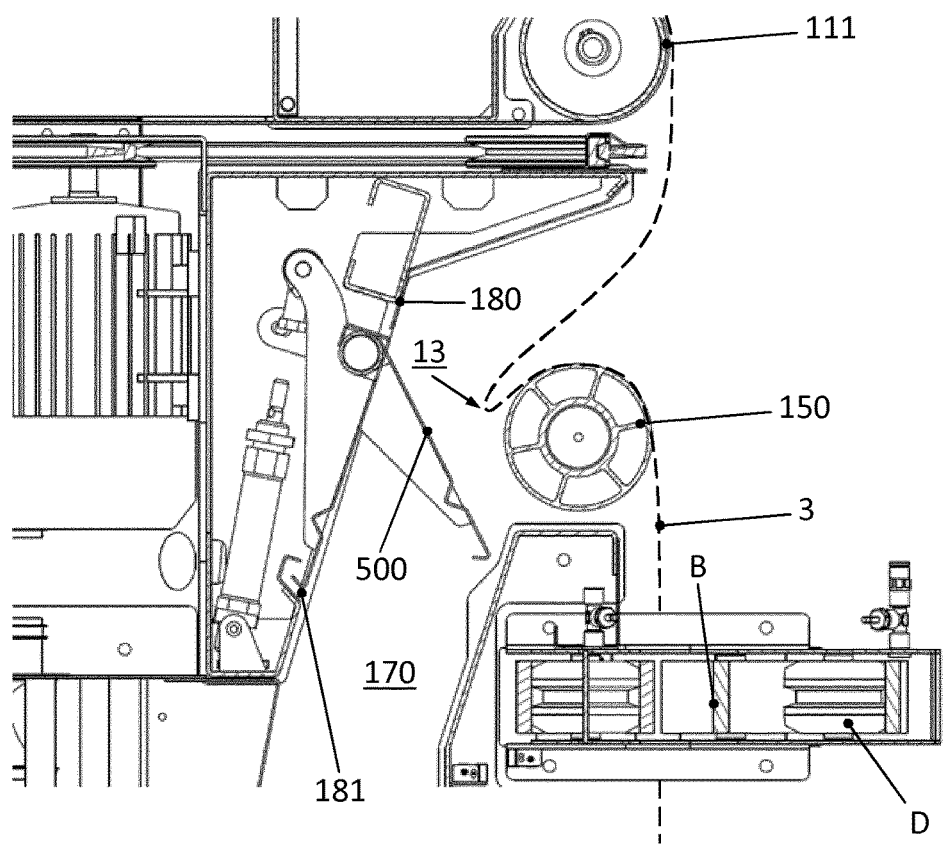
FIGS. 3 and 4 are enlarged views of upper and lower areas, respectively, of the apparatus of FIG. 2.

At this time the cloth 3 will form a loop 13 within a suction chute 170, as shown in FIG. 3 and as in the prior art shown in FIG. 1, drawn therein by the further action of a suction fan 119. The suction fan 119 sucks air into the suction chute 170 via apertures 185 formed in a wall 404 of a suction chamber 200 contiguous with a lower end of the suction chute 170, see FIG. 4.

The intense downward flow of air along the surface of the cloth 3 in the suction chute 170 generated by the suction fan 119 gives rises to a desirable flattening of the cloth 3 by removing folds, assisted where necessary by a horizontally moving belt B with brushes, which belt is driven by a drive D mounted to a respective side wall 106. It will be understood that the belt B is arranged such that the suspended portion of the cloth 3 extends in an elongated vertical gap between the belt B and the roller 150, along the width of the cloth 3. This is shown schematically in FIG. 3.

In FIG. 3 a chute 170 shutter 500 is shown in a closed position; this shutter 500 is normally closed and is opened, i.e. turned away from the shown position, to allow access into the chute 170 of the cloth 3 and such that air flows into the chute 170 from the mouth thereof. The shutter may be closed to avoid premature suction force to be applied on cloth suspended from the principal conveyor 101, at which time air is drawn into the chute by the suction fan 119 via an air access 181 below the shutter 500.

Figure 4:
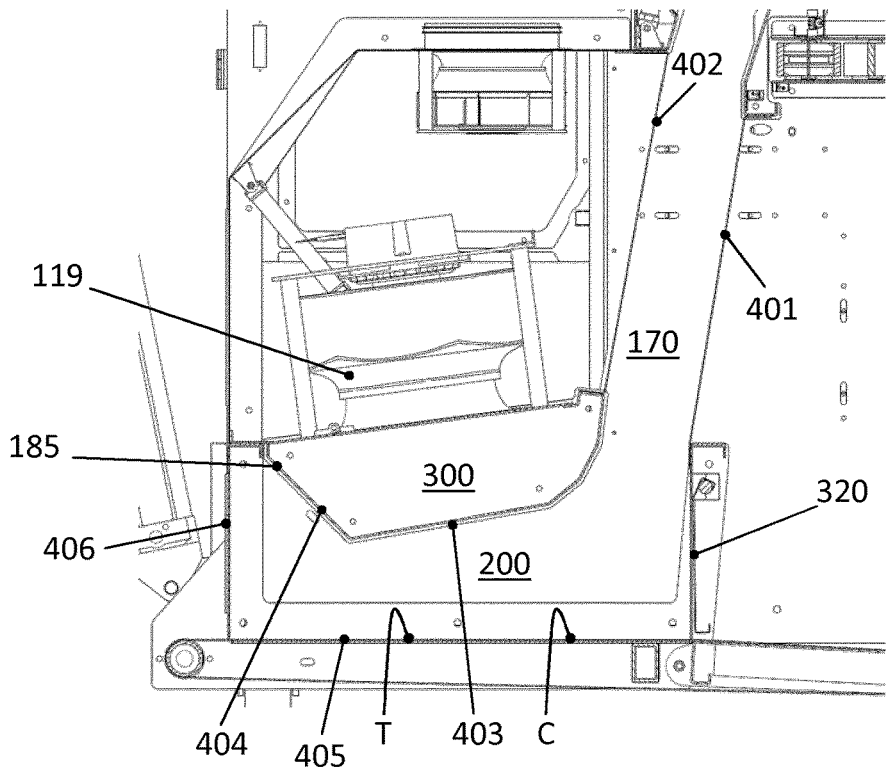

The suction chute 170 is part of a suction box shown in the enlarged view of FIG. 4 and including a suction chamber 200 at the lower end of the suction chute 170. The suction box system S of the shown embodiment of the invention includes i.a. the suction box, the suction fan 119, an intermediate chamber 300 and a conveyor C to be described and having a top surface T. The suction box is defined by opposite walls 401, 402 delimiting the chute 170, a top wall 403, a rear wall 406, possibly equipped with access doors 406' (see FIG. 6), and an apertured wall 404 extending close to the rear wall 406 and having apertures 185, such as by being formed by, or comprising, a grating-like structure. The suction fan 119 communicates with the suction chamber 200 via the intermediate chamber 300 and the apertures 185 formed in the apertured wall 404. The sides of the suction box may be defined by the side walls 106 of the apparatus 100. In an embodiment of the suction box system the top wall 403 has an apertured wall portion 404 with the grating-like structure that defines flow apertures being located at a rear portion of the suction chamber 200 opposite the front portion, the apertured wall portion 404 diverging away from the bottom wall 405.

In operation of a suction box system S as shown in FIG. 1 and FIGS. 2-6 problems arise if the cloth 3 looped inside the suction chute 7, 170 for some reason falls off the principal conveyor 4, 101 or the spreader 120. The immediate effect is that the cloth 3 falls into the suction chamber 200 where it is immediately drawn towards the apertured wall by the suction fan 9, 119, eventually blocking the apertures 185 in the apertured wall 404. This may damage the fan 9, 119 and will at any rate require an operator to stop the apparatus 1, 100 while he accesses the suction chamber 200 to remove the cloth 3. It will be understood that failure to remove the cloth 3 from the suction chamber 200 will block the flow of air in the suction chute 170 so that subsequent pieces of cloth are not flattened.

To solve this problem, according to the invention a discharge conveyor C is provided for discharge of this cloth 3 collected in the suction chamber 200. The discharge conveyor has an upper run which preferably runs on top of a bottom wall 405 of the apparatus 100, with a lower run running below the bottom wall 405 of the apparatus 100 by the upper run extending through a narrow gap where the bottom wall 405 meets the rear wall 406. Alternatively, both runs may run inside the suction chamber 200 above the bottom wall 405. Preferably, the discharge conveyor C is a belt, or a series of belts arranged next to each other. Preferably, the discharge conveyor C has a width corresponding to the extension of the suction chamber between the opposite side walls 106.

The discharge conveyor C runs to the outside of the suction chamber C, into the gap between the partition wall 108 and the chute 170 wall 402 and then further towards the front side 104 of the apparatus 100, at which front side cloth 3 discharged from the suction chamber 200 may be picked up by an operator. Discharge of the cloth 3 may also be to other locations.

Figure 5:
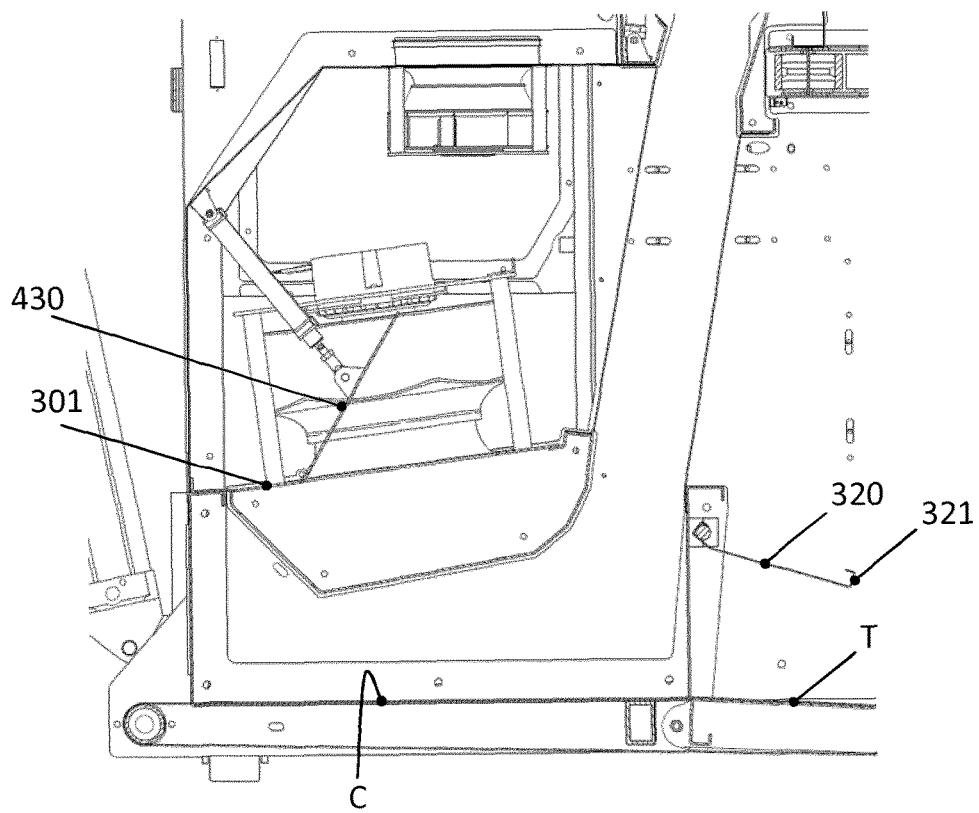
FIG. 5 is a view similar to FIG. 4, but showing the suction box system in a configuration for discharge of cloth in the suction chamber.

A discharge gate 320 formed in the wall 401 closest to the front side 104 of the apparatus 100 is provided and is selectively openable to allow for the aforementioned discharge while preferably sealing off the suction chamber when in a closed position (shown in FIG. 4) by a seal 321, such as in the form of bristles with tips bearing against the top surface T of the conveyor C; in FIG. 5 the discharge gate is shown in the open configuration wherein the conveyor C is activated to move cloth 3 from the inside of the suction chamber 200 through an elongated passage in the wall 401 left open by the raised discharge gate 320. The discharge gate 320 may as shown be operated to swing about a hinge, such as by action of a hydraulic/pneumatic actuator (not shown).

Preferably, a computer-implemented controller (not shown) is provided for operating the discharge gate 320 on sensors detecting the presence of cloths inside the vacuum chamber 200, near the rear wall 406 to which the cloth 3 will be drawn by the air still drawn into the suction chamber via the apertures 185; at the same time the conveyor C is activated.

It will be understood that for the flow of air through the suction chute 170 to be intense the suction fan 119 will normally run at a high speed. This, at the same time, means that an immediate stopping of the suction fan 119 to eliminated or sufficiently reduce the suction is not possible, whereby the cloth 3 in the suction chamber 200 will cling to the wall 404 for a period of time before the cloth can be discharged from the suction chamber 200 by the running conveyor belt C.

To solve this problem, according to the invention an air access gate 430 is provided, which air access gate 430 in the shown embodiment is illustrated in an open configuration in FIG. 5 while shown in the closed configuration in FIGS. 2-4 and 6. The air access gate 430 is operable for temporarily reducing or suspending suction applied by the fan 119 through the air flow passages 185 in the apertured wall 404 such that the cloth in the suction chamber 200 may be discharged unhindered by any strong flow of air flowing in the suction chamber 200 towards the apertured wall 404.

While the air access gate 430 may be a shutter/plate that simply shuts off the air flow passages 185 it is preferred to form the air access gate 430 as a door which allows air to be still drawn into the suction fan 119 operating at normal speed but now directly from the ambient directly through a passage into the intermediate chamber 300, opened by swinging or otherwise moving the air access gate 430 to an open position. By properly dimensioning the passage opened by operating the air access gate 430 an immediate elimination of flow of air through the suction chamber 200 may be attained, in that air by-passes the suction chamber 200.

Figure 6:
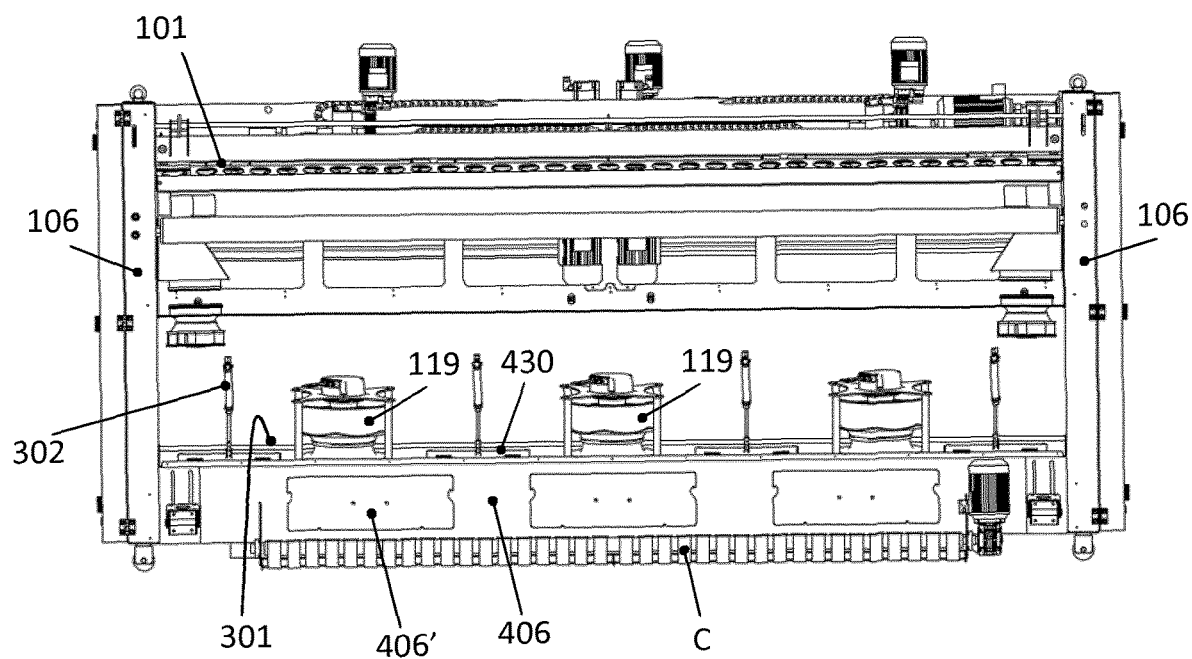
FIG. 6 is a rear view (seen to the right in FIG. 2) of the apparatus of FIG. 1.

As shown in FIG. 6 several suction fans 119 may be provided, each communicating with the intermediate chamber 300; likewise, several air access gates 430 for the by-pass may be provided between the suction fans 119, each being operable by an actuator 302 activated by the aforementioned controller on the sensors detecting cloth in the suction chamber.

It is noted that, as shown, the apertured wall 404 preferably is arranged to connect with the rear wall 406 of the suction chamber 200 and to extend upwardly/diverge away from the bottom wall 405 of the suction chamber, which suction chamber 200 elsewhere is preferably designed such that the top wall 403 and the bottom wall 405 converge. Through this design, which may in principle be incorporated in any type of suction box system, even without the discharge conveyor C and gates discussed above, such as the one shown in the aforementioned CH 681 638, the risk the cloth in the suction chamber 200 is drawn against the apertures 185 to block them and damage the fan 119 is reduced since the effect of gravity must be overcome.

The invention claimed is:

1. An apparatus (100) for receiving and spreading out/extending cloth (3), such as pieces of laundry, comprising:
   a) a set of spreader clamps (20) for releasably receiving a pair of corners of said cloth (3) and for said spreading out of said cloth (3),
   b) a suction box system (S) including:
      a suction chute (170) connected with a front portion of a suction chamber (200) and having a mouth for receiving said cloth (3), and
      a suction fan (119) communicating with a rear portion of said suction chamber (200) via a number of air flow passages (185),
      said suction fan (119) establishing suction in said suction chamber (200) and said suction chute (170),
   characterised in said suction box system (S) additionally including:
      a discharge conveyor (C) in said suction chamber (200) for discharge of cloth (3) collected in said suction chamber (200),
      a discharge gate (320) selectively openable for said discharge, and
      an air access gate (430) operable for temporarily reducing suction applied by said fan (119) through said air flow passages (185).

2. The apparatus of claim 1, further comprising a controller for operating said discharge gate (320) and said air access gate (430), for said discharge to occur with said reduced suction applied.

3. The apparatus of claim 1, said air access gate (430) closing said air flow passages (185).

4. The apparatus of claim 1, said suction box system (S) comprising an intermediate chamber (300) between said suction fan (119) and said suction chamber (200), said air access gate (430) establishing direct air flow communication between said intermediate chamber (300) and the ambient.

5. The apparatus of claim 1, said suction chamber (200) having a bottom (405), said discharge conveyor (C) being mounted on said bottom (405).

6. The apparatus of claim 1, said discharge gate (320) having a seal (321) sealing against said discharge conveyor (C).

7. The apparatus of claim 1, said suction chamber (200) being defined by a bottom wall (405), opposite end walls (106), and a top wall (403) having an apertured wall portion (404) with said air flow apertures being located at said rear portion of said suction chamber (200) opposite said front portion, said apertured wall portion (404) preferably diverging away from said bottom wall (405).

8. A suction box system (S) for a cloth spreader comprising:
   a suction chute (170),
   a suction chamber (200),
   said suction chute (170) being connected with a front portion of said suction chamber (200) and having a mouth for receiving said cloth (3), and
   a suction fan (119) communicating with a rear portion of said suction chamber (200) via a number of air flow passages (185),
   said suction fan (119) establishing suction in said suction chamber (200) and said suction chute (170),
   said suction chamber (200) being defined by a bottom wall (405), opposite end walls (106), and a top wall (403) having a wall portion (404) with a grating-like structure defining flow apertures being located at a rear portion of said suction chamber (200) opposite said front portion, said wall portion (404) diverging away from said bottom wall (405), and a conveyor (C) in said suction chamber (200), for cloth collected in said suction chamber (200).

\* \* \* \* \*